Aug. 9, 1949.  J. SNEED  2,478,333
SELF-ENERGIZING DISK BRAKE
Filed Sept. 3, 1946  2 Sheets-Sheet 1

INVENTOR.
JOHN SNEED
BY
ATTORNEYS

Aug. 9, 1949.  J. SNEED  2,478,333
SELF-ENERGIZING DISK BRAKE
Filed Sept. 3, 1946  2 Sheets-Sheet 2
FIG.2.
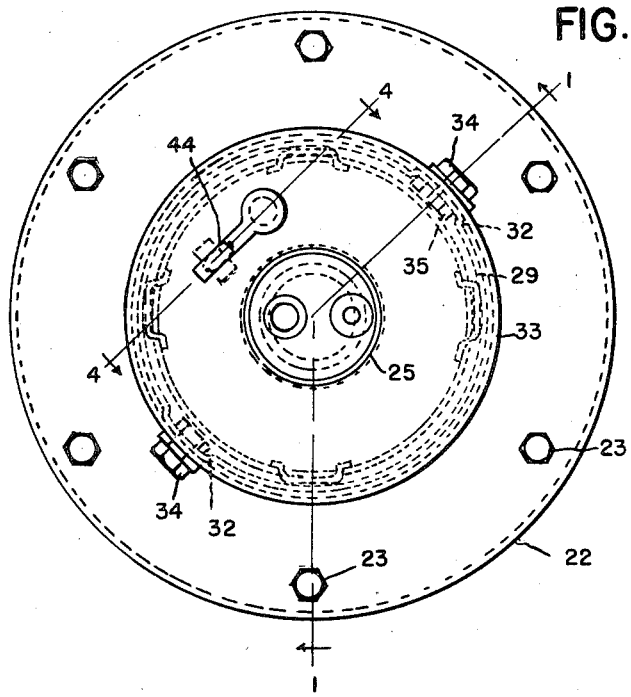
FIG.4.
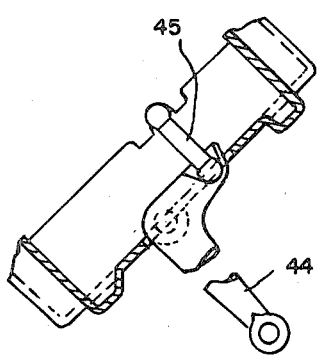
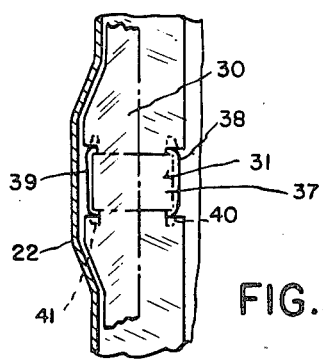
FIG.3.
INVENTOR.
JOHN SNEED
BY
ATTORNEYS Patented Aug. 9, 1949

2,478,333

UNITED STATES PATENT OFFICE 2,478,333

SELF-ENERGIZING DISK BRAKE

John Sneed, Detroit, Mich., assignor to Kelsey-Hayes Wheel Company, Detroit, Mich., a corporation of Delaware Application September 3, 1946, Serial No. 694,625

3 Claims. (Cl. 188—72)

The invention relates to brakes and refers more particularly to brakes of that type in which an initial relatively small effort is required to obtain a final powerful braking action.

The invention has for one of its objects to provide an improved brake of simple construction in which the pressure of the brake members against each other is automatically increased by means operable by one of the brake members after the brake members have been initially applied.

The invention has for another object to provide an improved brake in which the means for initially engaging the brake members against each other is engageable with the central portion of one of the brake members.

The invention has for a further object to provide an improved brake having novel applying means including tension links.

With these as well as other objects in view, the invention resides in the novel features of construction and combinations and arrangements of parts as more fully hereinafter set forth.

In the drawings—

Figure 2 is an end view of the brake;

Figure 3 is a cross section on the line 3—3 of Figure 1;

Figure 4 is a cross section on the line 4—4 of Figure 2.

Figure 1:
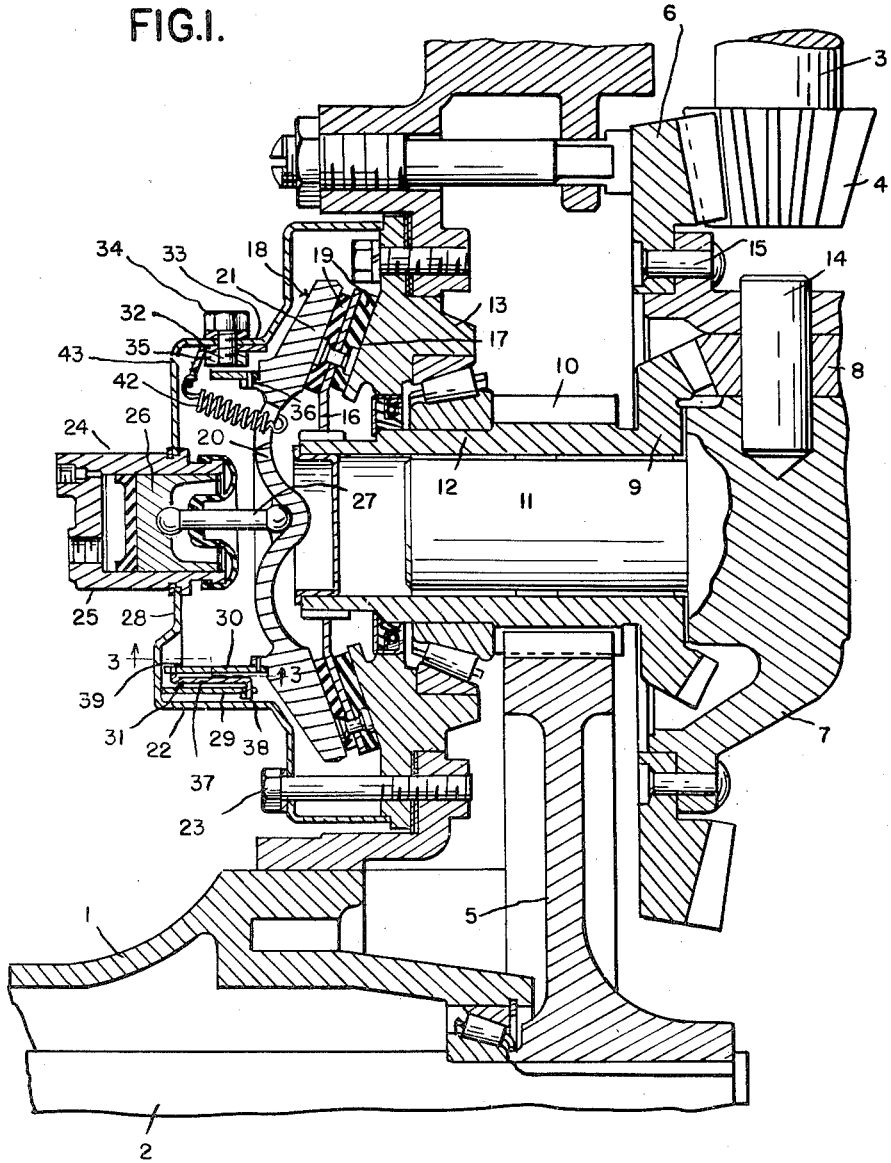
Figure 1 is a horizontal section of a portion of a tractor in the plane of the axis of the rear axle and showing in section a brake embodying the invention with the brake section on the line 1—1 of Figure 2.

The brake embodying the invention is in the present instance applied to a tractor which has the rear axle housing 1 and the shafts 2 journaled in the housing and having secured to their outer ends suitable ground wheels (not shown). The shafts 2 are adapted to be driven from the propeller shaft 3 through the driving pinion 4 on the propeller shaft, the driven gears 5 on the axle shafts and differential gearing between the driving pinion and the driven gears. The differential gearing comprises the ring gear 6 meshing with the driving pinion 4, the spider 7 carrying the ring gear, the bevel pinions 8 on the spider, the bevel pinions 9 meshing with the bevel pinions 8 and the driven pinions 10 driven by the bevel pinions 9 and meshing with the driven gears 5. The spider 7 has the axially aligned stub shafts 11 at opposite sides and journaled in the hollow shafts or sleeves 12 which in turn are journaled in the frame 13 forming part of the tractor housing for the differential gearing. Each hollow shaft or sleeve has a bevel pinion 9 and a driven pinion 10 integral therewith. The spider 7 carries the angularly spaced radial pins 14 on which the bevel pinions 8 are journaled. As shown, the ring gear 6 is secured to the spider 7 by the rivets 15.

There is a brake for each shaft 2 and since the two brakes are alike, but one will be described.

Each brake comprises the brake members 16, 17 and 18. The brake member 16 is rotatable and longitudinally slidably mounted on an end of and splined to a hollow shaft or sleeve 12. The brake member 16 is preferably a disc having a frusto-conical portion with suitable brake linings 19 secured to its opposite sides and forming annular friction faces. The brake member 17 is non-rotatable, it being a part of the stationary frame 13 and having an annular friction face for cooperating with the adjacent friction face of the rotatable brake member. The brake member 18 has limited rotation and is located at the side of the rotatable brake member 16 opposite the non-rotatable or stationary brake member 17. The brake member 18 has the central web 20 and the integral thickened body 21 at the periphery of the web and provided with an annular friction face for cooperating with the adjacent friction face of the rotatable brake member. The brake also comprises the cage 22 which is preferably formed of sheet metal and houses the brake members and is fixedly secured to the frame 13 by suitable means, such as the bolts 23. The brake further comprises means engageable with one of the brake members for applying the brake by bringing the friction faces of the brake members into engagement.

The brake applying means comprises the fluid pressure operated actuator 24 which is formed of the cylinder 25, the piston 26 slidable within the cylinder and the piston rod 27. The actuator is coaxial with the brake members and its cylinder 25 is mounted centrally in the web 28 of the cage 22 and its piston rod 27 is preferably provided with ball-shaped ends engaging the head of the piston 26 and the central portion of the web 20 of the brake member 18. For increasing the pressure of the brake members against each other after their friction faces have been initially engaged by the operation of the fluid pressure operated actuator, I have provided means including links located between the brake member 18 and the cage 22. The means comprises the outer ring 29 carried by the cage 22, the inner ring 30 spaced from and substantially concentric with the outer ring and carried by the brake member 18 and the tension links 31 extending between the rings and operatively connected to the rings so that when the brake member 19 rotates, relative rotation of the rings 29 and 30 takes place to cause the tension links to rock, thereby moving the brake member 18 more firmly against the brake member 16. The outer ring 29 is provided with the diametrically opposite bosses 32 which contact with the side wall 33 of the cage 22 and are secured to the side wall by the bolts 34 and nuts 35, the latter being permanently secured to the bosses as by being brazed thereto. The inner ring 30 abuts the brake member 18 and is secured to the brake member by suitable means, such as the pins 36, so that the inner ring rotates with the brake member. Each tension link has the rectangular body 37 extending between the rings substantially axially of the brake and the out-turned and in-turned flanges 38 and 39 at the inner and outer ends of the body extending through open-ended notches in the outer and inner rings, respectively. In addition, these end flanges are formed with the wings 40 and 41, respectively, for extending over the sides of the rings opposite the body of each link to maintain the link in assembled relation.

To return the brake member 18 to its normal or off position, I have provided the coil springs 42 having their inner ends hooked to the web 20 of the brake member 18 and their outer ends hooked to the inturned projections 43 on the outer ring 29.

To mechanically operate the brake, I have provided the bell crank lever 44 and the rod 45, the former being pivotally mounted on the web 28 of the cage 22 and the latter preferably having ball-shaped ends engaging an arm of the bell crank lever and the central web 20 of the brake member 19.

In operation, it will be seen that when braking fluid under pressure is forced into the fluid pressure operated actuator 24, the brake member 18 will be moved toward and against the rotatable brake member 16 and if the pressure of the braking fluid is sufficient the rotatable brake member 16 will also be forced against the non-rotatable brake member 17. Upon engagement of the friction faces of the brake members the brake member 18 will rotate and carry with it the inner ring 30, which causes the tension links 31 to swing about parts of the flanges 38 and 39 diagonally of the bodies 37, thereby moving the brake member 18 more firmly against the rotatable brake member 16 and the latter more firmly against the stationary brake member 17 to increase the pressures of these brake members against each other. When the braking fluid pressure is relieved, the parts will be returned to their normal or off positions by the coil springs 42. It is apparent that the brake may also be applied by manually swinging the bell crank lever 44.

What I claim as my invention is:

1. A brake comprising a rotatable brake member, a second brake member having limited rotation, means engageable with one of said brake members for relatively moving said brake members against each other, and means for increasing the pressure of said brake members against each other upon rotation of said second brake member, said means comprising a stationary ring, a second ring movable with said second brake member, one of said rings being an outer ring and the other of said rings being an inner ring extending within said first mentioned ring, and tension links extending between and abutting opposite ends of said rings.

2. A brake comprising a rotatable brake member, a second brake member having limited rotation, a stationary cage, means carried by said cage and engageable with the central portion of said second brake member for moving the latter against said first mentioned brake member, and means comprising a ring carried by said cage, a second ring movable with said second brake member, and tension links operatively connected to said rings for increasing the pressure of said second brake member upon rotation thereof against said first mentioned brake member.

3. A brake comprising a rotatable brake member, a second brake member having limited rotation, a stationary cage, means carried by said cage for moving said second brake member against said first mentioned brake member, means dependent upon rotation of said second brake member for increasing the pressure thereof against said first mentioned brake member, said means comprising an outer ring carried by said cage, a second ring carried by said second brake member, and extending within and radially spaced from said outer ring, and links extending within the space between said rings and having oppositely extending portions operatively connected to opposite ends of said rings, and spring means for normally holding said second brake member in off position.

JOHN SNEED.

REFERENCES CITED

The following references are of record in the file of this patent:

UNITED STATES PATENTS

| Number | Name | Date |
| --- | --- | --- |
| 2,245,987 | Lambert | June 17, 1941 |
| 2,263,505 | Lambert | Nov. 18, 1941 |
| 2,366,094 | Forbes | Dec. 26, 1944 |